(12) United States Patent
Miller

(10) Patent No.: US 6,782,596 B2
(45) Date of Patent: Aug. 31, 2004

(54) FIDUCIAL CALIBRATION SYSTEMS AND METHODS FOR MANUFACTURING, INSPECTION, AND ASSEMBLY

(75) Inventor: Jimmie Andrew Miller, Salisbury, NC (US)

(73) Assignee: University of North Carolina at Charlotte, Charlotte, NC (US)

( * ) Notice: Subject to any disclaimer, the term of this patent is extended or adjusted under 35 U.S.C. 154(b) by 142 days.

(21) Appl. No.: 10/007,051

(22) Filed: Dec. 6, 2001

(65) Prior Publication Data

US 2002/0108226 A1 Aug. 15, 2002

Related U.S. Application Data

(60) Provisional application No. 60/268,672, filed on Feb. 13, 2001.

(51) Int. Cl.[7] ............................................. B23Q 17/00
(52) U.S. Cl. ........................... 29/407.05; 29/407.09; 409/80; 702/105; 700/145
(58) Field of Search ..................... 29/407.01, 407.05, 29/407.04, 407.09, 557, 558; 409/80, 207; 702/90, 95, 105; 700/145, 95, 303

(56) References Cited

U.S. PATENT DOCUMENTS

| | | | |
|---|---|---|---|
| 4,299,061 A | * 11/1981 | Parnum et al. | 451/239 |
| 4,689,448 A | 8/1987 | Snyder et al. | 178/19 |
| 4,775,281 A | 10/1988 | Prentakis | 414/416 |
| 4,780,617 A | 10/1988 | Umatate et al. | 250/548 |
| 4,833,621 A | 5/1989 | Umatate | 364/491 |
| 5,246,316 A | * 9/1993 | Smith | 409/80 |
| 5,428,446 A | 6/1995 | Ziegert et al. | 356/358 |
| 5,487,440 A | 1/1996 | Seemann | 180/164 |
| 5,521,036 A | 5/1996 | Iwamoto et al. | 430/22 |
| 5,610,102 A | 3/1997 | Gardopee et al. | 437/225 |
| 5,633,707 A | 5/1997 | Seemann | 356/35.5 |
| 5,732,163 A | 3/1998 | Brandstetter et al. | 382/296 |
| 5,779,405 A | 7/1998 | Aiso et al. | 409/132 |
| 5,795,112 A | 8/1998 | Senda | 409/131 |
| 5,825,017 A | * 10/1998 | Pryor | 250/208.1 |
| 5,833,407 A | 11/1998 | Senda | 409/131 |
| 5,871,391 A | * 2/1999 | Pryor | 451/9 |
| 5,895,181 A | 4/1999 | Ito et al. | 409/132 |
| 5,903,459 A | 5/1999 | Greenwood et al. | 364/468.17 |
| 5,920,483 A | 7/1999 | Greenwood et al. | 364/474.35 |
| 5,949,685 A | 9/1999 | Greenwood et al. | 364/474.35 |
| 6,061,169 A | 5/2000 | Feldman et al. | 359/280 |
| 6,154,714 A | 11/2000 | Lepejian | 702/118 |
| 6,673,315 B2 | * 1/2004 | Sheridan et al. | 422/50 |
| 2003/0144809 A1 | * 7/2003 | Puchtler | 702/105 |

* cited by examiner

Primary Examiner—David P. Bryant
(74) Attorney, Agent, or Firm—Kilpatrick Stockton LLP

(57) ABSTRACT

Fiducial calibration systems and methods for precisely and accurately manufacturing a part from a workpiece, inspecting or measuring a part, and/or assembling a plurality of manufactured parts including providing a workpiece, wherein the workpiece and the associated processes are subject to environmental and structural variations, and disposing a plurality of datums on a surface of or within the workpiece. The systems and methods also including calibrating the separation distance between each of the plurality of datums to workpiece distance units and disposing the workpiece in a machine, wherein the machine is subject to environmental and structural variations. The systems and methods further including calibrating a coordinate system of the machine to the workpiece distance units, manufacturing the part from the workpiece, inspecting or measuring the part, and/or assembling the plurality of manufactured parts utilizing the calibrated machine, and intermittently recalibrating the machine to the workpiece distance units.

26 Claims, 6 Drawing Sheets

FIDUCIAL CALIBRATION SYSTEMS AND METHODS FOR MANUFACTURING, INSPECTION, AND ASSEMBLY

CROSS-REFERENCE TO RELATED APPLICATIONS

This non-provisional patent application claims the benefit of U.S. Provisional Patent Application No. 60/268,672, filed Feb. 13, 2001, which is hereby incorporated in full by reference.

FIELD OF THE INVENTION

The present invention relates generally to fiducial calibration systems and methods for use in manufacturing, inspection, and assembly applications. More specifically, the present invention relates to fiducial calibration systems and methods that utilize a plurality of workpiece metrology references.

BACKGROUND

It has long been a challenge in manufacturing, inspection, and assembly applications to more precisely and accurately position the tool or probe of a machine with respect to a workpiece, such that part errors may be determined or predicted and minimized or eliminated. This challenge is most acute when a manufacturing, inspection, or assembly process is carried out in the presence of environmental variations, such as thermal variations in a manufacturing or assembly facility or those associated with open-bay machining applications. Problems may also be encountered when tight or nanometric tolerances are required, such as those associated with micro-electromechanical systems (MEMS) applications or micro/nano-electronics applications, and when large parts are being manufactured, inspected by measurement, or assembled, such as in aerospace applications.

Manufacturing, inspection, and assembly machines typically include a controller capable of specifying a part coordinate system rigidly defined with reference to the coordinate system of the machine. This may be accomplished through, for example, linear and/or rotational transformation of the coordinates. As a result, the part coordinate system is only as precise and accurate as the underlying machine coordinate system. As discussed above, both the workpiece or part and the machine are subject to thermal and structural variations. These variations may alter the real position of the tool or probe with respect to the workpiece during the manufacturing, inspection, or assembly process, resulting in real part errors, measurement errors during inspection, or assembly alignment errors.

There have been a number of attempts to overcome these challenges and to control or correct these problems, many of which are specific to a particular manufacturing or assembly process. Typically, these systems and methods involve measuring the geometric errors associated with a given machine or tool and/or the relative position of a workpiece. Corrections are then made to command the position of the machine or tool to manufacture a part within predetermined tolerances.

Various United States patents disclose such conventional systems and methods. For example, U.S. Pat. No. 5,428,446 discloses a laser interferometry-based ball bar test gauge for use in spatial dimensional metrology applications. In another example, U.S. Pat. No. 5,903,459 discloses a machine control and product acceptance method augmented by external measurement feedback. The positions of a toolholder and a workpiece are measured using a laser tracker and compared to generate a machine correction code. U.S. Pat. Nos. 5,920,483 and 5,949,685 disclose the use of an interferometric laser tracker or other three-dimensional position sensor to monitor part shape and to measure machine changes due to thermal variations. Machine position corrections are made via trickle feed media statements. U.S. Pat. No. 4,780,617 discloses a semiconductor device manufacturing method by which the alignment of a substrate within an exposure apparatus is corrected via the measurement of a plurality of marks. Orientation, rotation, and expansion errors associated with the wafers are part of the realignment calculation. Positions and errors are measured, corrected, and commanded utilizing the position coordinates of steppers. U.S. Pat. No. 4,833,621 discloses another substrate alignment method and apparatus with a reticle facilitated by measuring multiple reference areas and statistically averaging the areas. The average areas are used to more precisely and accurately position the wafer under the reticle for exposure. U.S. Pat. No. 5,521,036 discloses a further positioning method and apparatus suitable for use with an exposure apparatus employed in a lithography process for manufacturing semiconductor elements and liquid crystal devices. Alignment is facilitated by utilizing various patterns disposed on a mask, the patterns associated with a desired chip pattern. Finally, U.S. Pat. No. 5,610,102 discloses a method for co-registering semiconductor wafers undergoing work in one or more blind process modules. Mounting techniques are utilized in conjunction with pattern recognition and flexures for adjustment.

What is still needed are fiducial calibration systems and methods that reference machine positioning metrology directly to the current state of a workpiece, while extricating the positioning metrology from the current state of the manufacturing or assembly machine. What is needed are systems and methods that allow for a reduction in manufacturing errors, including those errors that are unpredictable, immeasurable, and changing. What is also needed are systems and methods that allow manufactured parts, such as airfoils, to be assembled with critical dimensions and alignments.

BRIEF SUMMARY

The present invention provides systems and methods that utilize a plurality of workpiece metrology references, such that a machine or tool that is to perform an operation may be fiducially calibrated to the workpiece. These workpiece metrology references may be inherent, intrinsic, fabricated, removable, real, or virtual datums rigidly attached to or associated with the stock material from which a part is to be manufactured. The systems and methods of the present invention may be employed before or between the steps of an existing manufacturing or assembly process, reducing positioning and alignment errors between a tool or probe and a workpiece. These fiducial calibration systems and methods reference machine positioning metrology directly to the current state of a workpiece, while extricating the positioning metrology from the current state of the manufacturing or assembly machine. Thus, the systems and methods of the present invention calibrate and reference the metrology of a machine including a tool or probe to the changeable state of a workpiece or part.

In one embodiment of the present invention, a fiducial calibration method for precisely and accurately manufacturing a part from a workpiece includes providing a workpiece, wherein the workpiece is subject to environmental and structural variations, and disposing a plurality of datums on a surface of or within the workpiece. The method also includes disposing the workpiece in a machine, wherein the machine is subject to environmental and structural variations, with the separation distance between each of the plurality of datums calibrated to workpiece distance units. The method further includes calibrating a coordinate system of the machine to the workpiece distance units, measuring or manufacturing the part from the workpiece utilizing the calibrated machine, and intermittently recalibrating the machine to the workpiece distance units.

In another embodiment of the present invention, a fiducial calibration method for precisely and accurately assembling a plurality of manufactured parts includes providing a plurality of parts, the plurality of parts having a plurality of datums on a surface of or within each of the plurality of parts, wherein each of the plurality of parts is subject to environmental and structural variations. The method also includes disposing the plurality of parts in a machine operable for assembling the plurality of parts, wherein the machine is subject to environmental and structural variations, with the separation distance between each of the plurality of datums calibrated to workpiece distance units. The method further includes calibrating a coordinate system of the machine to the workpiece distance units, assembling the plurality of parts utilizing the calibrated machine, and intermittently recalibrating the machine to the workpiece distance units.

In a further embodiment of the present invention, a fiducial calibration system for precisely and accurately manufacturing a part from a workpiece includes a workpiece having a surface, wherein the workpiece is subject to environmental and structural variations, and a plurality of datums disposed on the surface of or within the workpiece. The system also includes a machine operable for holding the workpiece and measuring or manufacturing a part from the workpiece, wherein the machine is subject to environmental and structural variations. The system further includes means for calibrating the separation distance between each of the plurality of datums to workpiece distance units, means for calibrating a coordinate system of the machine to the workpiece distance units, and means for intermittently recalibrating the machine to the workpiece distance units.

In a further embodiment of the present invention, a fiducial calibration system for precisely and accurately assembling a plurality of manufactured parts includes a plurality of parts, the plurality of parts having a plurality of datums disposed on a surface of or within each of the plurality of parts, wherein each of the plurality of parts is subject to environmental and structural variations. The system also includes a machine operable for holding and assembling the plurality of parts, wherein the machine is subject to environmental and structural variations. The system further includes means for calibrating the separation distance between each of the plurality of datums to workpiece distance units, means for calibrating a coordinate system of the machine to the workpiece distance units, and means for intermittently recalibrating the machine to the workpiece distance units.

The systems and methods of the present invention may also be utilized to precisely and accurately inspect a part or a plurality of assembled parts.

DETAILED DESCRIPTION

Although workpiece datums have been used to define the axes for a reference coordinate system with respect to a workpiece, such datums have not been used to establish the dimensional metric, i.e. the standard unit of length. By providing this standard unit of length, machines and tools may be dimensionally calibrated to a workpiece standard. A part specification may then be transferred to a manufacturing specification whereby the dimensions are specified by a percentage of the established workpiece dimensional metrology unit. Thus, regardless of the machine, tool, or probe being used, the manufacturing, inspection, or assembly metrology base is referenced to the workpiece and extricated from the mutable machine. Additionally, as a workpiece is transferred between machines, the metric is also transferred.

Figure 1:
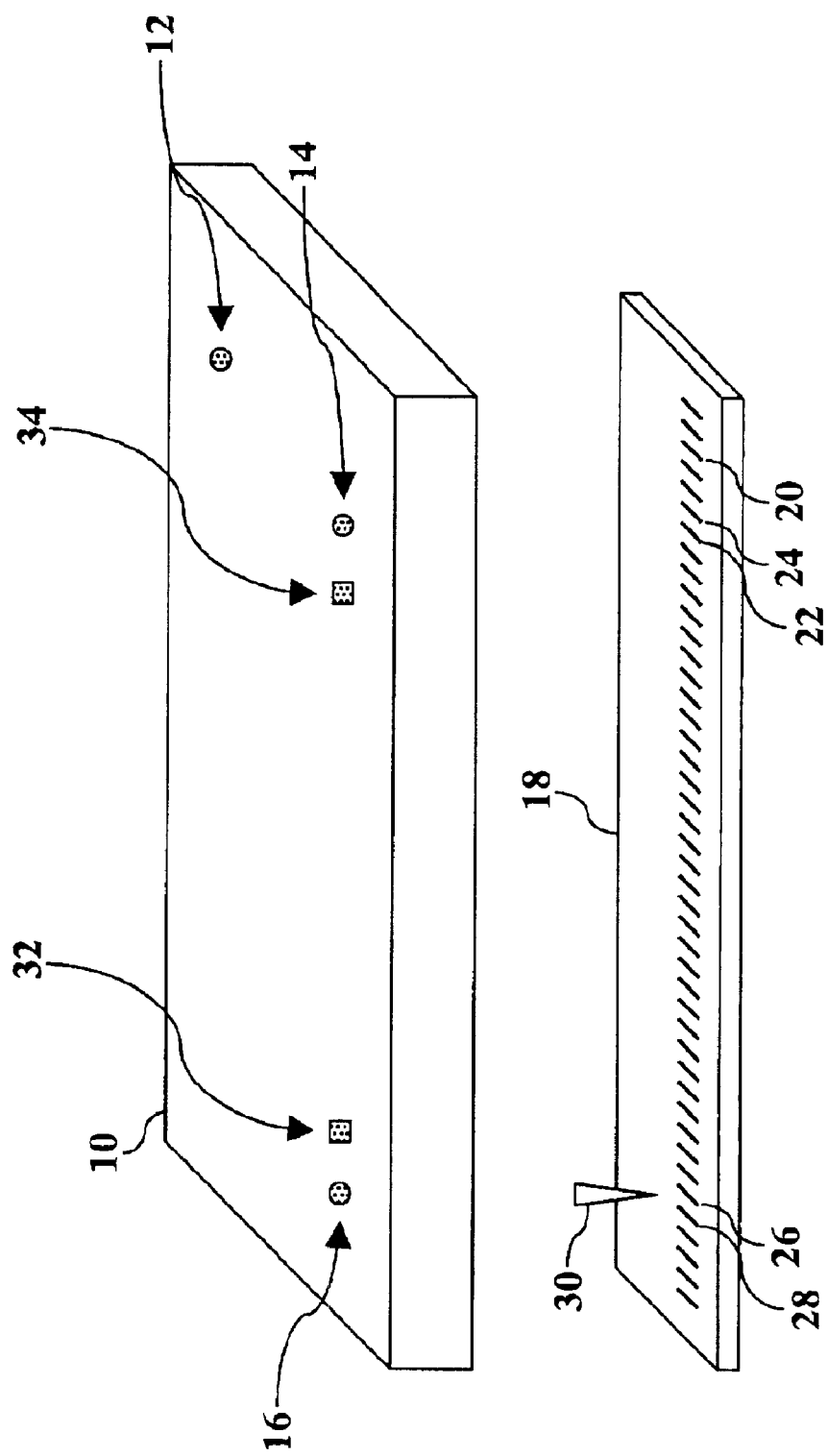
FIG. 1 is a perspective view of a workpiece, illustrating the relationship between thermal and structural variations in the workpiece, a machine, and a scale and manufacturing or assembly part errors.

Referring to FIG. 1, a workpiece 10 with three datums 12,14,16 is shown. The workpiece 10 is disposed within and supported by a manufacturing or assembly machine (not shown) that includes a positioning reference scale 18 incorporating a plurality of marks 20,22,24,26,28. A tool, probe, or other device (not shown) may be positioned directly above one of the datums 16. As a consequence, a readhead 30 of the scale 18 is positioned directly above one of the marks 26. The workpiece 10 may be moved such that the tool or probe is positioned above another one of the datums 14 and the readhead 30 of the scale 18 is positioned above another one of the marks 22, with N marks between the original mark 26 and the subsequent mark 22. When either the machine, the workpiece 10, or the scale 18 change temperature, an associated dimensional expansion or contraction occurs. If the workpiece 10 expands, the readhead 30 of the scale 18 may be positioned above other marks 28, 24 as the tool or probe is positioned above the datums 16,14. This may correspond to, for example, N+2 marks separation. If only the scale 18 expands, the number of marks separating the positions below the readhead 30 when the tool or probe is positioned above the datums 16,14 may be, for example, N−1. If only the machine changes thermally or structurally, the marks 28,24 below the readhead 30 as the tool or probe is positioned above the datums 16,14 may be, for example, separated by N+1 marks. Suppose, in the absence of the datums 12,14,16, that it is desirable to manufacture features on the workpiece 10 at the location of the datums 16,14. Having only the scale 18 with which to determine position, the separation error between the features may be equivalent to three marks on the scale 18.

Techniques including measuring the temperature of the workpiece 10 or scale 18 and correcting the commanded machine position may properly space desired features relative to one another while the workpiece is in a manufacturing state, however, the position of such features on the part may be significantly imprecise or inaccurate unless all errors caused by the changing state of the entire machine and workpiece are corrected. Temperature corrections involve inherent uncertainty. Coefficients of expansion of the workpiece and scale materials and the like must be considered and significantly limit the ability to precisely and accurately correct.

Referring again to FIG. 1, assume that it is desirable to manufacture two features 32,34 on the workpiece 10 in the presence of the datums 16,14. Also assume that the distance between the datums 16,14, determined before the part is disposed within the machine, is 4,000 workpiece distance units (WDU). These WDU thermally expand and contract with the part. If it is desirable to manufacture the features 32,34 with a separation of 2,000 WDU with one feature 32 specified as 1,000 WDU from one datum 16, the systems and methods of the present invention allow the scale 18 to be calibrated to the WDU via the datums 16,14. This calibration may take place before and/or during manufacturing or assembly to compensate for the changing state of the workpiece 10, the scale 18, and the machine. For example, if the datums 16,14 initially correspond to marks 1,000 and 9,000 on the scale 18, then the features 32,34 are manufactured at marks 3,000 and 7,000 on the scale 18. Thus, the manufacturing process has been extricated from the temperature of the workpiece 10 and scale 18. If the temperature of the part increases during the manufacturing of one feature 32, the machine is preferably recalibrated to correspond to mark 990, which is 0 WDU from one datum 16, and mark 9,030, which is 4,000 WDU from that datum 16. The other feature 34 is positioned at mark 7,020, which is now 4,000 WDU from the datum 16, or mark 990 on the scale 18. This may be referred to as "process-intermittent calibration." The same recalibration technique compensates for a change in the thermal state of the scale 18. If the thermal state of the workpiece 10 and the scale 18 do not change, but the machine structure does, the 0 WDU position of one datum 16 is at mark 950 and the 4,000 WDU position of the other datum 14 is at mark 8,950. Thus, if one feature 32 is manufactured prior to the machine structure change and the other feature 34 is manufactured afterwards, a machine recalibration between the manufacture of the two features still yields a separation of 2,000 WDU.

Figure 2:
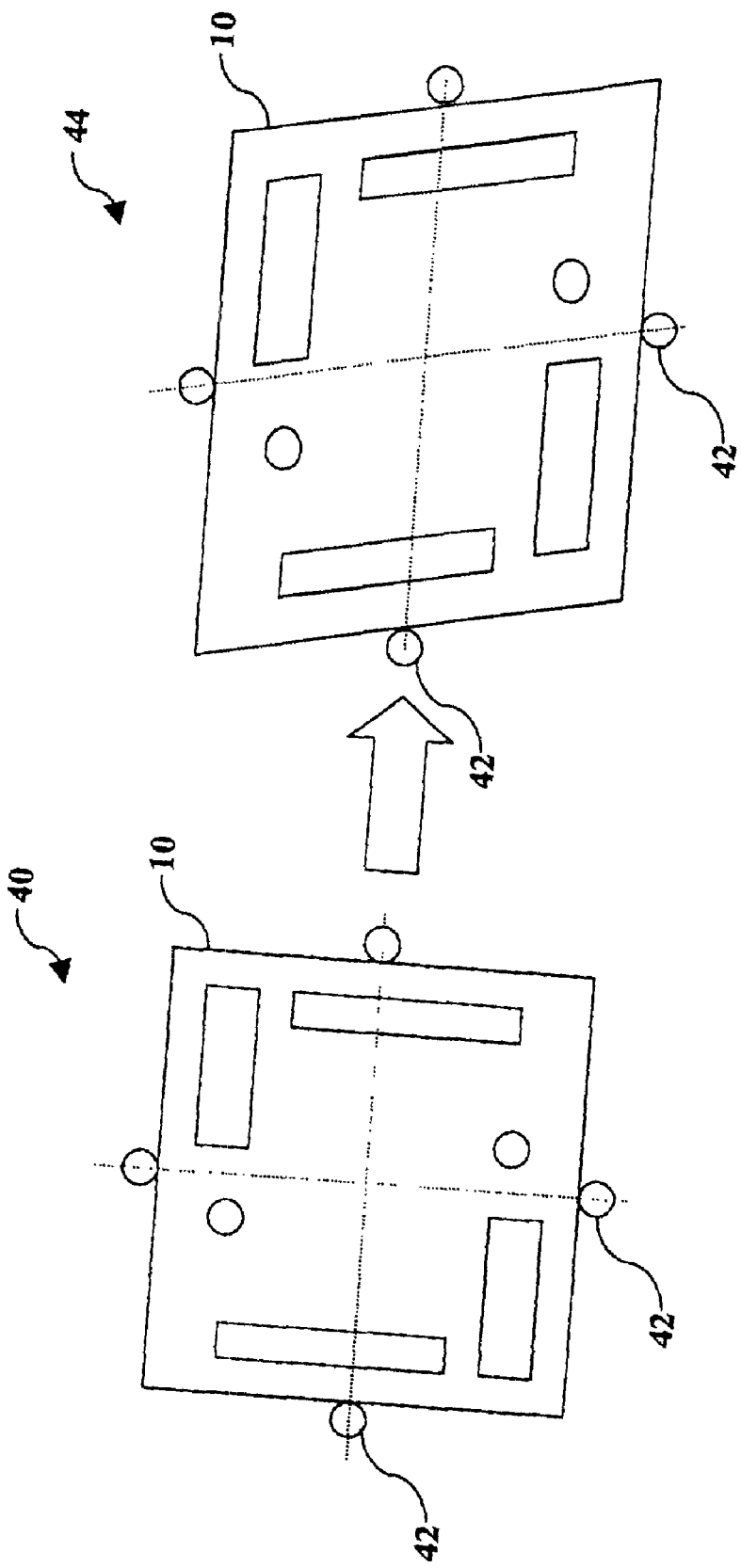
FIG. 2 is planar view of one embodiment of a fiducial calibration technique for use in manufacturing and assembly applications, highlighting a part designed in standard workpiece distance units (WDU)

Referring to FIG. 2, in one embodiment of the present invention, the fiducial calibration technique for use in manufacturing and assembly applications includes a part 40 designed in standard spatial units, or WDU. A plurality of datums 42 are rigidly attached to or associated with the workpiece 10 or stock material from which the part 40 is to be manufactured. The datums 42 may be inherent, intrinsic, fabricated, removable, real, or virtual. Following an environmental variation, such as a thermal variation, the datums 42 provide an invariant working coordinate system 44 calibrated to WDU. This coordinate system 44, although spatially asymmetrical and non-rectilinear in the machine coordinates, correctly references features in the workpiece coordinates with associated WDU and may be used for measurement, machining, and assembly.

WDU may be related to standard spatial dimensions at a given temperature. For example, 4,000 WDU may be equivalent to 40 cm when a part is in equilibrium at 20 degrees C. However, features on a workpiece 10 separated by 4,000 WDU remain separated by 4,000 WDU at any temperature.

A workpiece 10 that has at least three datums 42 may be utilized as a reference for angular calibration since, by knowing the lengths of three sides of a triangle, three angles may be calculated along with two-dimensional coordinates. This process is known as "trilateration." The three lengths between and three datums 42 determine three angles. By measuring the position of the datums 42 in the machine system and comparing the positions with the angles and distances, the squareness error between nominal stage axes may be determined along with the position and orientation of the workpiece 10.

Figure 3:
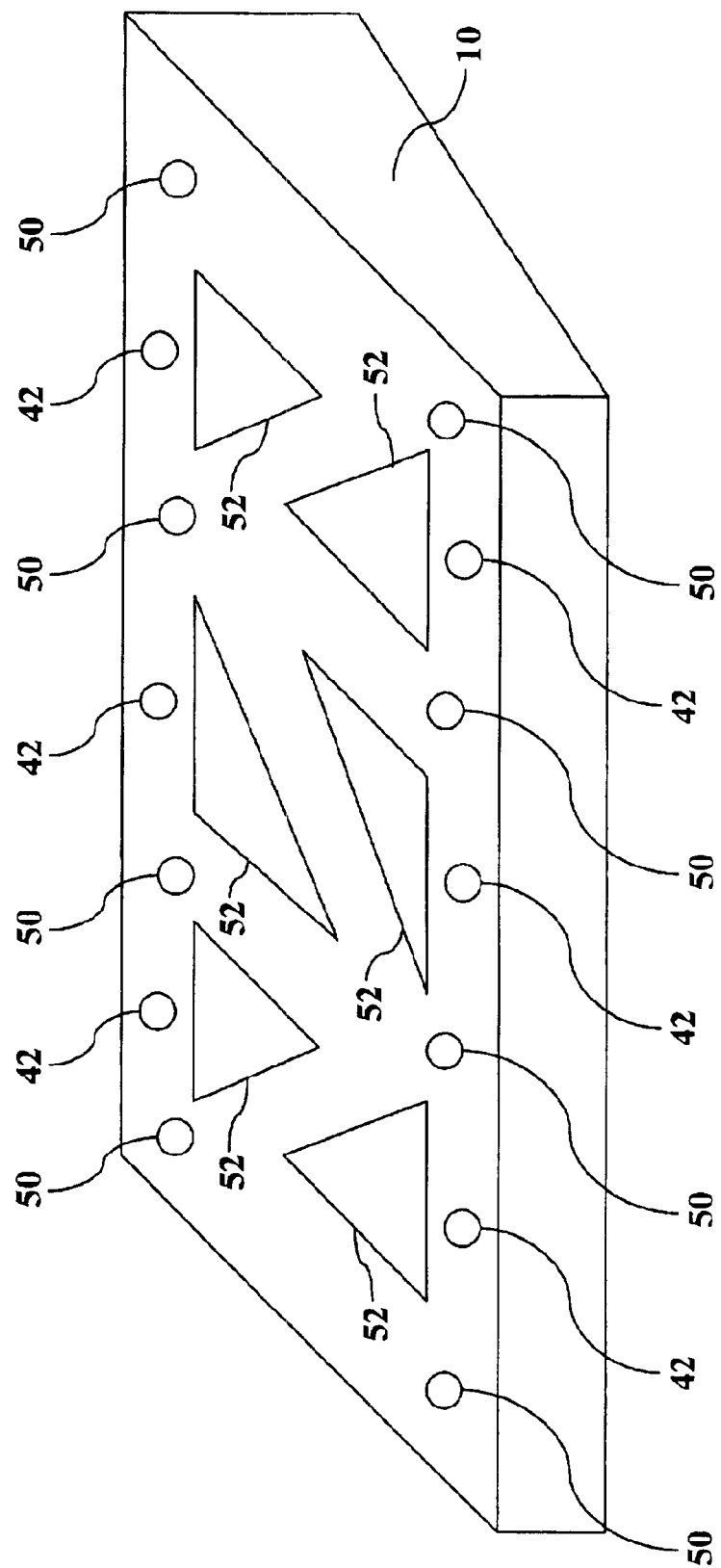
FIG. 3 is a perspective view of another embodiment of the fiducial calibration technique of the present invention, highlighting a plurality of datums used to calibrate a manufacturing machine in a specific region of the workpiece.

Referring to FIG. 3, in another embodiment of the present invention, a large workpiece 10 utilizing a plurality of datums 42 allows a manufacturing machine to be calibrated in a specific region of the workpiece 10, reducing part errors caused by localized linear and/or rotational displacement of the machine. The plurality of datums 42 may be distributed across a surface of the workpiece 10 in order to facilitate the manufacturing of a first feature 50 and a second feature 52. The separation distance, in WDU, between each of the plurality of datums 42 may be used to calibrate the machine, such that a more precise and accurate part may be manufactured. The distribution of the plurality of datums 42 need not be in a regular pattern to provide localized calibration capabilities.

Figure 4:
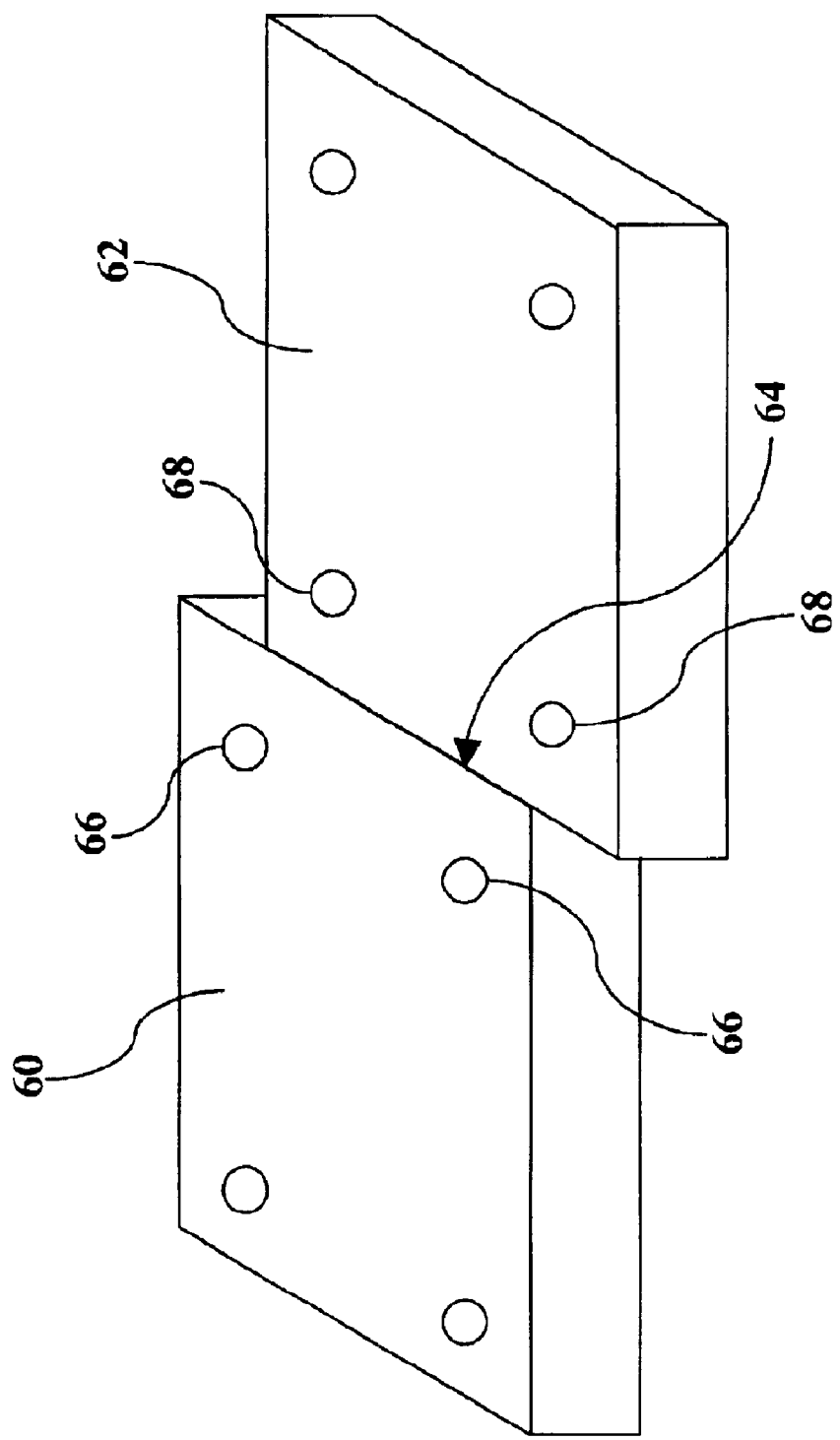
FIG. 4 is a perspective view of a further embodiment of the fiducial calibration technique of the present invention, illustrating the assembly of two or more parts utilizing a plurality of datums.

Referring to FIG. 4, in a further embodiment of the present invention, two or more parts 60,62 with workpiece datums 66,68 whose positions and separations are known in WDU may be assembled within predetermined tolerances. Once the manufacturing of the workpieces 60,62 is complete, the resulting parts may be assembled using the existing workpiece datums 66,68. For example, a first workpiece 60 may be joined to a second workpiece 62 along a line 64. By measuring the WDU between a first set of datums 66 and a second set of datums 68 and comparing these distances to a predetermined value, positions for each workpiece 60,62 may be achieved with minimum error and/or proper spacer sizes may be determined.

The manufacturing metrology of parts has typically been limited by measurement capabilities in the working environment. Thermal variations in both the measuring machine and the part to be measured have complicated matters to the degree that quality assurance on the shop floor has been severely limited. It may take a part several hours to come to the standard measurement temperature of 20 degrees C. Datums on a part, determined in WDU, along with the spatial dimensions of manufactured features, specified in WDU, allow quality assurance to be carried out regardless of the thermal state of a part or machine. If necessary, a final verification of the WDU of datums that have defined the manufacturing process may be carried out at 20 degrees C. This final verification may be used to determine if part distortions have occurred during the manufacturing process and appropriate corrections to the process may be made.

The placement of datums on stock material from which a part is to be manufactured is dependent upon the design of the finished part. The datums are preferably placed in a manner that does not hinder or prevent the manufacturing process. The placement may also depend upon the manner in which datum separations are to be determined. The nature of the datum, whether it is a tooling ball or socket on a workpiece to be machined or a line or patterned array on a microelectronic substrate, may determine the manner in which the separation of the datums is to be determined. The WDU may be determined intrinsically. For example, a given number of atomic lattice spacings may equal one WDU. A measured distance at a given part temperature may also be used as a reference. If the datum spacing in WDU is determined for a workpiece having a temperature other than 20 degrees C, uncertainty in the coefficient of expansion of the stock material is reflected in uncertainty of the WDU-to-standard distance ratio.

Figure 5:
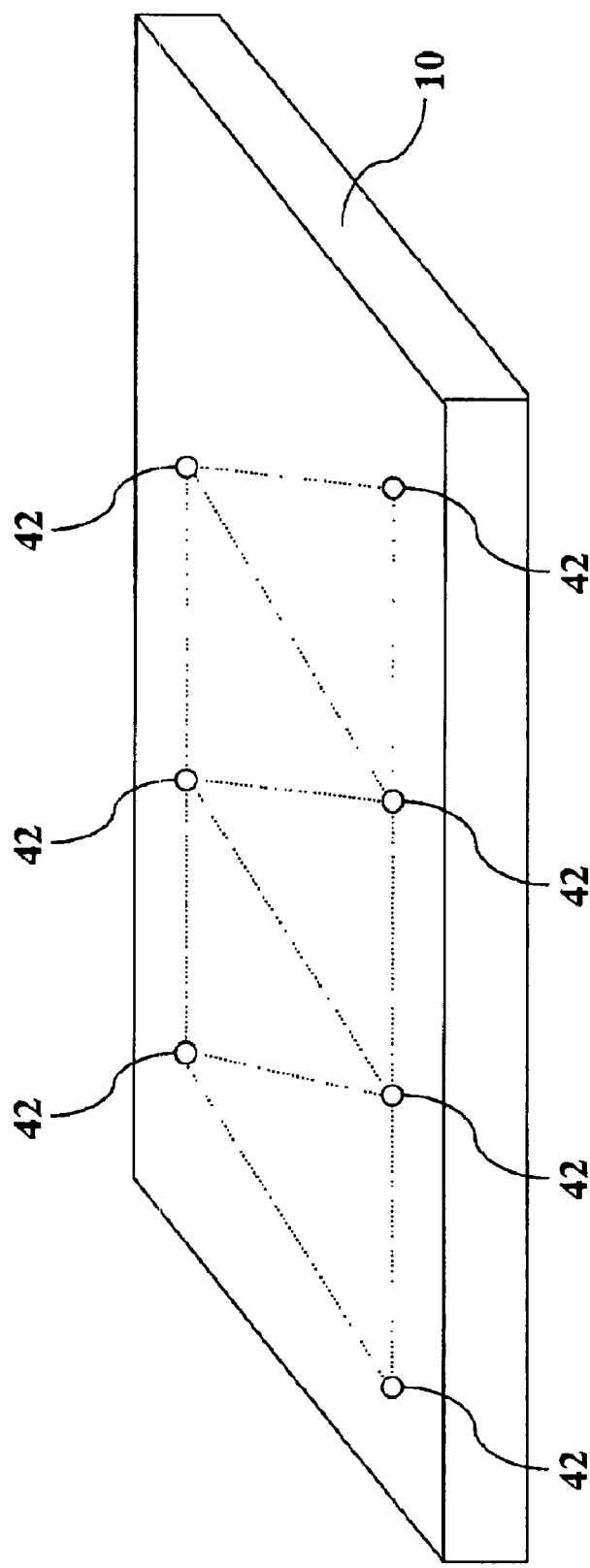
FIG. 5 is a perspective view of one embodiment of a workpiece including a plurality of datums, the plurality of datums arranged in a substantially equilateral pattern.

Referring to FIG. 5, in a further embodiment of the present invention, if the datums 42 are tooling balls or sockets, then extensible ball bars used for the parametric testing of machine tools may be used to provide the initial measurements of the datums 42, provided that the extensible ball bars are calibrated to a reference. Available extensible ball bars typically have a limited displacement range and, thus, the datums 42 are preferably placed in a pattern comprising a plurality of substantially equilaterial triangles. The tooling balls or sockets may be placed on a workpiece 10 such that the distance between adjacent datums 42 is approximately equal to the nominal length of the extensible ball bars. Suitable extensible ball bars include, for example, laser ball bars, capable of greater length variations than conventional extensible ball bars. This greater flexibility in length allows the datums 42 to be placed in a nonsymmetrical manner in accordance with design limitations. Datum patterns may also be calibrated in WDU using the laser ball bars such that the laser ball bars provide confirming redundant data.

Figure 6:
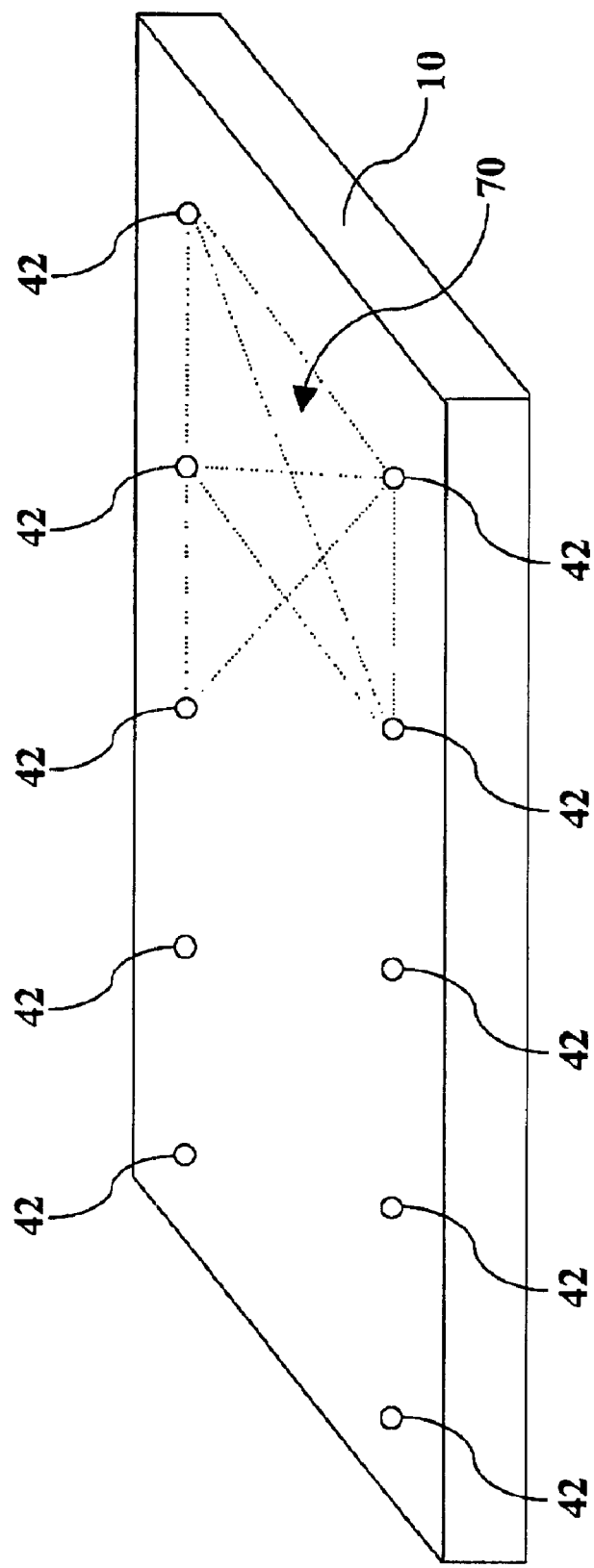
FIG. 6 is a perspective view of another embodiment of a workpiece including a plurality of datums, the plurality of datums arranged in a substantially quadrilateral pattern.

Referring to FIG. 6, in a further embodiment of the present invention, the datums 42 may be arranged in a regular pattern on the surface of a workpiece 10 such that measurements may be taken along a plurality of lines 70. The position of each datum 42 may be used to confirm each measurement, reducing uncertainty. Distortion occurring during manufacturing may be monitored in a process intermittent fashion using, for example, an extensible ball bar.

It should be noted that the calibration of the separation between datums 42 may be carried out utilizing, for example, extensible ball bars, a coordinate measuring machine, a touch-trigger probe, an analog probe, a digital probe, an optical probe, a contact probe, a non-contact probe, a manufacturing machine, a measuring machine, and the like. The placement of datums 42 may be carried out utilizing, for example, a calibrated master plate or mask, a calibrated master plate including tooling balls and/or sockets, a calibrated master fabrication machine, an optical lithography machine, an electron beam tool, an electromagnetic radiation machine, a high energy particle machine, and the like.

Exemplary Applications

Preferred embodiments of the present invention have many applications. The separation distance between two datums on the surface of a workpiece may comprise 10,000 atoms. Although, during nano-electronic manufacturing, with critical spatial dimensions of nanometers, the temperature of the part may increase, there are still 10,000 atoms between the two datums. Thus, a feature may be defined that is 4,987 atoms separated from the first datum. Alternatively, 1,000 atoms may define a standard unit. The feature may then be specified as 4,987 units, or 498.7% of a unit, separated from the first datum. Thus, a temperature independent specification is achieved.

In microelectronics, steppers are typically used to position a wafer under a light source during several manufacturing steps. By calibrating and recalibrating the machine to the wafer in subsequent steps, pattern overlay may be achieved with higher precision and accuracy. Patterns are typically disposed on the surface of the wafer for referencing and determining wafer position, orientation, and expansion in the machine coordinate system. If a pattern exists on the wafer that allows machine calibration, manufacturing may be achieved across various process modules with increased precision and accuracy. If, for example, a standard master mask was made from a material that exhibited little or no expansion, such as Invar, Zerodur, or ULE, or had a substantially similar coefficient of expansion as that of silicon or another suitable wafer material, a process may be utilized to place substantially similar calibration datums on a plurality of wafers. The master mask may be measured and produced to create a known WDU for the plurality of wafers. These wafers could then be distributed by suppliers with a known spacing between the datums, such as 10,000 lattice-spacings equal to 1 WDU and 4,000 WDU between datums.

In aerospace applications, airframes may be manufactured from a single piece of stock material. The web structure must be machined to tight tolerances for maximum performance, secure assembly, and reliable modeling. Holes for rivets must be drilled for the skin to be attached. Because the machines that manufacture these structures and features have working ranges of tens of meters, the placement of features requires precise and accurate processes.

Although the present invention has been described with reference to preferred embodiments and exemplary applications thereof, other embodiments may achieve the same results and the systems and methods of the present invention may be utilized in conjunction with other applications. For example, the systems and methods of the present invention may be utilized in conjunction with any micro, macro, or nanowire manufacturing or assembly applications. Variations in and modifications to the present invention will be apparent to those of ordinary skill in the art and the following claims are intended to cover all such equivalent embodiments and applications.

What is claimed is:

1. A fiducial calibration method for precisely and accurately manufacturing a part from a workpiece, the method comprising:

providing a workpiece;

disposing a plurality of datums relative to the workpiece;

calibrating the separation distance between each of the plurality of datums to workpiece distance units;

disposing the workpiece in a machine;

calibrating the machine to the workpiece distance units; and manufacturing the part from the workpiece utilizing the calibrated machine.

2. The method of claim 1, further comprising periodically recalibrating the machine to the workpiece distance units.

3. The method of claim 1, wherein the workpiece and the machine are subject to environmental and structural variations.

4. The method of claim 3, wherein the workpiece and the machine are subject to thermal variations.

5. The method of claim 1, wherein disposing the plurality of datums relative to the workpiece comprises selecting a plurality of datums associated with the workpiece, wherein each of the plurality of datums is inherent in or intrinsic to the workpiece.

6. The method of claim 1, wherein the plurality of datums comprise fabricated datums.

7. The method of claim 1, wherein the plurality of datums comprise removable datums.

8. The method of claim 1, wherein the plurality of datums comprise virtual datums.

9. The method of claim 1, wherein the plurality of datums comprise a plurality of datums selected from the group consisting of tooling balls, sockets, marks, geometric stock material features, geometric workpiece features, implanted atoms, deposited atoms, and tagged atoms.

10. The method of claim 1, wherein the part to be manufactured from the workpiece comprises a micro-scale part.

11. The method of claim 1, wherein the part to be manufactured from the workpiece comprises a macro-scale part.

12. The method of claim 1, wherein the part to be manufactured from the workpiece comprises a nano-scale part.

13. A fiducial calibration method for precisely and accurately manufacturing a part from a workpiece, the method comprising:

provided a workpiece, wherein the workpiece is subject to environmental and structural variations;

disposing a plurality of datums on a surface of or within the workpiece;

calibrating the separation distance between each of the plurality of datums to workpiece distance units;

disposing the workpiece in a machine, wherein the machine is subject to environmental and structural variations;

calibrating a coordinate system of the machine to the workpiece distance units;

manufacturing the part from the workpiece utilizing the calibrated machine; and periodically recalibrating the machine to the workpiece distance units.

14. The method of claim 13, wherein the workpiece and the machine are subject to thermal variations.

15. The method of claim 13, wherein disposing the plurality of datums on the surface of or within the workpiece comprises selecting a plurality of datums associated with the workpiece, wherein each of the plurality of datums is inherent in or intrinsic to the workpiece.

16. The method of claim 13, wherein the plurality of datums comprise fabricated datums.

17. The method of claim 13, wherein the plurality of datums comprise removable datums.

18. The method of claim 13, wherein the plurality of datums comprise virtual datums.

19. The method of claim 13, wherein the plurality of datums comprise a plurality of datums selected from the group consisting of tooling balls, sockets, marks, geometric stock material features, geometric workpiece features, implanted atoms, deposited atoms, and tagged atoms.

20. A fiducial calibration system for precisely and accurately manufacturing a part from a workpiece, the system comprising:

a workpiece having a surface, wherein the workpiece is subject to environmental and structural variations;

a plurality of datums disposed relative to the workpiece;

a machine operable for holding the workpiece and manufacturing a part from the workpiece, wherein the machine is subject to environmental and structural variations;

means for calibrating the separation distance between each of the plurality of datums to workpiece distance units;

means for calibrating a coordinate system of the machine to the workpiece distance units; and means for periodically recalibrating the machine to the workpiece distance units.

21. The system of claim 20, wherein the workpiece and the machine are subject to thermal variations.

22. The system of claim 20, wherein each of the plurality of datums disposed relative to the workpiece comprises a datum that is inherent in or intrinsic to the workpiece.

23. The system of claim 20, wherein the plurality of datums comprise fabricated datums.

24. The system of claim 20, wherein the plurality of datums comprise removable datums.

25. The system of claim 20, wherein the plurality of datums comprise virtual datums.

26. The system of claim 20, wherein the plurality of datums comprise a plurality of datums selected from the group consisting of tooling balls, sockets, marks, geometric stock material features, geometric workpiece features, implanted atoms, deposited atoms, and tagged atoms.

* * * * *